(12) United States Patent
Toyoyama

(10) Patent No.: US 8,767,142 B2
(45) Date of Patent: Jul. 1, 2014

(54) LIQUID CRYSTAL DISPLAY DEVICE

(75) Inventor: Shinji Toyoyama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/704,213

(22) PCT Filed: Apr. 2, 2012

(86) PCT No.: PCT/JP2012/058938
§ 371 (c)(1),
(2), (4) Date: Dec. 13, 2012

(87) PCT Pub. No.: WO2013/046765
PCT Pub. Date: Apr. 4, 2013

(65) Prior Publication Data
US 2013/0141664 A1  Jun. 6, 2013

(30) Foreign Application Priority Data

Sep. 30, 2011  (JP) .................................. 2011-218364
Mar. 13, 2012  (JP) .................................. 2012-056479

(51) Int. Cl.
*G02F 1/1333* (2006.01)
*G02F 1/1335* (2006.01)

(52) U.S. Cl.
USPC ................................. 349/59; 349/58; 349/149

(58) Field of Classification Search
USPC ............................................. 349/58–65, 149
See application file for complete search history.

(56) References Cited

U.S. PATENT DOCUMENTS

| | | | |
|---|---|---|---|
| 2002/0159001 A1 | 10/2002 | Kim | |
| 2005/0024573 A1 | 2/2005 | Suzuki | |
| 2008/0078574 A1* | 4/2008 | Kang et al. | 174/358 |
| 2009/0195996 A1 | 8/2009 | Isono | |
| 2010/0214199 A1* | 8/2010 | Lin et al. | 345/82 |
| 2012/0008337 A1* | 1/2012 | Yu | 362/606 |
| 2012/0075552 A1* | 3/2012 | Lee et al. | 349/62 |

FOREIGN PATENT DOCUMENTS

| | | |
|---|---|---|
| JP | 2002-333607 A | 11/2002 |
| JP | 2005-49774 A | 2/2005 |
| JP | 2008-287293 A | 11/2008 |
| JP | 2009-186740 A | 8/2009 |
| JP | 2010-113214 A | 5/2010 |
| JP | 2010-243519 A | 10/2010 |
| JP | 2010-271629 A | 12/2010 |

* cited by examiner

*Primary Examiner* — Bumsuk Won
*Assistant Examiner* — Charles Chang
(74) *Attorney, Agent, or Firm* — Birch, Stewart, Kolasch & Birch, LLP

(57) ABSTRACT

A liquid crystal display device (1) includes a liquid crystal display panel (2), a metal backlight chassis (4), a metal bezel (13), a printed circuit board (31), an electric conductor (14) via which the metal backlight chassis (4) and a ground land part (31*f*) of the printed circuit board (31) are electrically connected with each other, and a frame (10) having an insertion hole in which the electric conductor (14) is inserted.

7 Claims, 11 Drawing Sheets

LIQUID CRYSTAL DISPLAY DEVICE

BACKGROUND OF THE INVENTION

1. Field of the Invention

The present invention relates to a liquid crystal display device. More specifically, the present invention relates to a liquid crystal display device which is configured to suppress EMI.

2. Description of the Related Art

In recent years, liquid crystal display devices have been used as display sections of electric home appliances such as computers and television sets. FIG. 10 is a cross sectional view schematically illustrating a main part of a structure of a typical liquid crystal display device.

As illustrated in FIG. 10, a liquid crystal display panel 2 included in a liquid crystal display device 60 is configured such that (i) a pair of substrates, i.e., a thin film transistor (TFT) array substrate 21 and a color filter (CF) substrate 22, are arranged so as to face each other in parallel at a predetermined distance and (ii) space between the thin film transistor (TFT) array substrate 21 and the color filter (CF) substrate 22 is filled with liquid crystal.

Usually, on the TFT array substrate 21, a plurality of gate wires and a plurality of source wires are arranged, and pixel electrodes are provided in respective regions defined by those wires in a lattice pattern. A common electrode is provided on the almost entire surface of the CF substrate 22. The liquid crystal panel 2 is configured such that, by changing a voltage applied to each of the pixel electrodes and a voltage applied to the common electrode, it is possible to drive the liquid crystal in each pixel and cause an image to be displayed.

Further, the liquid crystal display device 60 includes a backlight unit 3, which is provided on a backside of the liquid crystal display panel 2. The backlight unit 3 is a device which includes a light source such as a fluorescent lamp and which controls properties of light emitted from the light source and backlights the liquid crystal display panel 2. The light emitted from the backlight unit 3 passes through the liquid crystal display panel 2, thereby an image is visibly displayed on a front surface of the liquid crystal display panel 2. Usually, a metal bezel 61 is attached to the liquid crystal display panel 2 so as to cover an upper surface and a side surface of a periphery of the liquid crystal display panel 2.

In the periphery of such a liquid crystal display panel 2, a printed circuit board (PWB: Printed Wire Board or PCB: Printed Circuit Board) 31 is provided, which supplies a predetermined voltage to the gate wires and the source wires provided on the TFT array substrate 21 to thereby drive the liquid crystal. The printed circuit board 31 is electrically connected with the wires provided on the TFT array substrate 21 via a flexible wiring board 30 which has flexibility. Usually, a driver IC 28 is mounted on the flexible wiring board 30.

Among such flexible wiring boards 30, a flexible wiring board on which a driver IC 28 is mounted by COF (Chipon Film) is in wide use because the flexible wiring board does not have a device hole in which the driver IC 28 is to be mounted and therefore can be easily designed such that a pitch of wire patterns is narrow.

As illustrated in FIG. 10, the flexible wiring board 30 is constituted by a film substrate 30a which has flexibility and wire patterns 30b and 30b formed on the film substrate 30a, and the driver IC 28 is mounted by COF and connected to the wire patterns 30b and 30b. Extraction portions 30c and 30d of these wire patterns 30b and 30b are drawn to end portions of the film substrate 30a. The extraction portion 30c is connected to a land part of a source wire 24S of the liquid crystal display panel 2 via an anisotropic conductive film 62. On the other hand, the extraction portion 30d is connected to a wiring land part 31b of a wire pattern 31a on the printed circuit board 31 via an anisotropic conductive film 62, which wiring land part 31b is supplied with an image signal and a voltage based on the image signal.

According to this configuration, by bending the flexible wiring board 30 and providing the printed circuit board 31 in a space between a side surface of the backlight unit 3 and a side wall 61b of the metal bezel 61 as illustrated in FIG. 10, it is possible to reduce the width of an upper wall 61a of the metal bezel 61 which is in a shape of a frame and is attached so as to cover the liquid crystal display panel 2.

FIG. 11 is a plan view illustrating (i) the flexible wiring board 30 which is not bent and (ii) the liquid crystal display panel 2 and the printed circuit board 31 which are connected to each other via the flexible wiring board 30. As illustrated in FIG. 11, usually, a ground pattern 31c is provided on the almost entire surface of the printed circuit board 31 except for circuits such as the wiring land part 31b of the wire pattern 31a. The entire surface of the ground pattern 31c is covered with a solder resist film 31e serving as a corrosion-proof protection film. Note here that the ground pattern 31c has a plurality of ground land parts 31d, each of which is not covered with the solder resist 31e and exposed in a form of a rectangle.

In recent years, with the increased size etc. of a liquid crystal display panel 2, the length of a printed circuit board 31 like above has become greater. This has caused more electromagnetic waves to be generated from the printed circuit board 31. Under the circumstances, an appropriate design to suppress EMI (Electro Magnetic Interface: unnecessary radiation, electromagnetic radiation) is considered important.

An example of such a measure to suppress EMI is as follows. By electrically connecting the ground land parts 31d of the ground pattern 31c of the printed circuit board 31 with the metal bezel 61 at a plurality of points via a strip-shaped electric conductor 63 as illustrated in FIG. 11, it is possible to suppress radiation of electromagnetic waves generated from the printed circuit board 31.

An example of such an electric conductor 63 is one that is constituted by (i) an elastic member 63a such as a sponge and (ii) a metal foil 63b or the like which encloses the elastic member 63a (see FIG. 10). This makes it possible to electrically connect the ground pattern 31c of the printed circuit board 31 with the metal bezel 61 by (i) attaching the electric conductor 63 to the ground land parts 31d of the printed circuit board 31 via a conductive adhesive tape 64 in advance under a condition where the flexible wiring board 30 is not bent as shown in FIG. 11 and then (ii) attaching the metal bezel 61 as shown in FIG. 10 so that the electric conductor 63 is connected to the side wall 61b of the metal bezel 61.

The following Patent Literatures 1 and 2 each describes a liquid crystal display device configured to suppress EMI.

Patent Literature 1 discloses a liquid crystal display device including: a liquid crystal display panel; a frame-shaped metal bezel having a reversed L-shaped cross-section surface made up of an upper wall and a side wall, the frame-shaped metal bezel being attached so as to cover an upper surface and a side surface of a periphery of the liquid crystal display panel; a printed circuit board for driving liquid crystal, the printed circuit board being provided, between the periphery of the liquid crystal display panel and the side wall of the metal bezel, in substantially parallel to and away from the side wall; and an electric conductor in a shape of a plate, the electric conductor electrically connecting the side wall of the metal bezel to a land part of a ground pattern on the printed circuit board, wherein an upper wall of the metal bezel has an insertion hole in which the electric conductor is inserted from outside, one end of the electric conductor inserted in the insertion hole is in contact with both the side wall of the metal bezel and the land part of the ground pattern of the printed circuit board, and the other end of the electric conductor is removably hooked on the insertion hole.

FIG. 8 is a view illustrating a cross section of a liquid crystal display device described in Patent Literature 1. A liquid crystal display device 70 in accordance with FIG. 8 is configured such that (i) an electric conductor 14 in a shape of a plate passes through an insertion hole 13c of a metal bezel 13 and (ii) a ground land part 31d of a printed circuit board 31 is electrically connected to the metal bezel 13 via the electric conductor 14 in the shape of a plate. Since the electric conductor 14 is designed to be removably hooked on the insertion hole 13c, it is possible to easily attach and remove the electric conductor 14 if unnecessary radiation occurs.

According to the liquid crystal display device described in Patent Literature 1, it is possible to attach or remove the electric conductor as appropriate without removing the metal bezel attached so as to cover the liquid crystal display panel, i.e., while keeping the metal bezel attached to the liquid crystal display panel. Therefore, it is possible to easily control a measure to suppress EMI in the liquid crystal display device.

On the other hand, Patent Literature 2 discloses a display device including: a display panel, a frame-shaped metal bezel having a reversed L-shaped cross-section surface made up of an upper wall and a side wall, the frame-shaped metal bezel being attached so as to cover an upper surface and a side surface of a periphery of the display panel; a printed circuit board for driving a panel, the printed circuit board being provided, between the periphery of the display panel and the side wall of the metal bezel, in substantially parallel to and away from the side wall; and an electric conductor in a shape of a strip which electrically connects the side wall of the metal bezel to a land part of a ground pattern on the printed circuit board, wherein the side wall of the metal bezel has a window through which the electric conductor can be seen from outside.

FIG. 9 is a view illustrating a cross section of a liquid crystal display device described in Patent Literature 2. A display device 80 in accordance with FIG. 9 is configured such that (i) a ground land part 31d of a printed circuit board 31 is electrically connected to a metal bezel 13 via an electric conductor 14 and (ii) a window 13c is provided to a side wall 13b of the metal bezel 13 so that displacement of the electric conductor 14 can be easily checked.

According to the liquid crystal display device described in Patent Literature 2, since the side wall of the metal bezel is provided with the window through which the electric conductor provided inside the side wall of the metal bezel can be seen from outside, it is possible to easily check, through the window, whether or not the electric conductor is displaced from an appropriate position while keeping the metal bezel attached to the display panel. As such, it is possible to easily detect displacement of the electric conductor and to efficiently assemble the display device.

CITATION LIST

Patent Literatures

Patent Literature 1
Japanese Patent Application Publication, Tokukai, No. 2010-113214 A (Publication Date: May 20, 2010)

Patent Literature 2
Japanese Patent Application Publication, Tokukai, No. 2010-271629 A (Publication Date: Dec. 2, 2010)

SUMMARY OF INVENTION

Technical Problem

The inventor has found that, according to the techniques described in Patent Literatures 1 and 2, (i) it is expected that a ground of a source substrate stably brings about an effect of reducing unnecessary radiation by being electrically connected to a bezel but (ii) unnecessary radiation may rather increase because noise generated in the source substrate is conveyed to the bezel via an electric conductor and therefore the bezel electrically resonates. More specifically, the inventor has found that the techniques described in Patent Literatures 1 and 2 may rather cause an increase in unnecessary radiation because, since the metal bezel is in the shape of a bar and thus noise currents are easy to concentrate, resonance occurs in which a screwed part serves as a node.

The present invention has been made in view of the findings obtained by the inventor, and a main object of the present invention is to provide a liquid crystal display device capable of suppressing unnecessary radiation.

Solution to Problem

In order to attain the above object, a liquid crystal display device in accordance with the present invention includes: a liquid crystal display panel; a metal backlight chassis attached so as to cover a back surface of a backlight unit which irradiates the liquid crystal display panel with light; a bezel in a shape of a frame, which bezel is attached so as to cover an upper surface and a side surface of a periphery of the liquid crystal display panel; a printed circuit board provided between a periphery of the backlight unit and the bezel; an electric conductor via which a side wall of the metal backlight chassis and a ground land part of the printed circuit board are electrically connected with each other; and a frame provided between the metal backlight chassis and the printed circuit board, the frame having an insertion hole in which the electric conductor is inserted.

According to the above configuration, the ground land part of the printed circuit board is electrically connected to the metal backlight chassis. The metal backlight chassis is provided so as to cover the back surface of the backlight unit which irradiates the liquid crystal display panel with light, and therefore noise currents are not concentrated in the metal backlight chassis. Therefore, according to the above configuration, unnecessary radiation is suppressed as compared to conventional techniques.

Further, according to the above configuration, the electric conductor via which the side wall of the metal backlight chassis and the ground land part of the printed circuit board are electrically connected is inserted in the insertion hole in the frame. Therefore, the electric conductor is fixed by the insertion hole, and the position of the electric conductor does not change. This makes it possible to prevent the electric conductor from being displaced and thus prevent short circuits etc. from occurring in wires.

A liquid crystal display device in accordance with the present invention includes: a liquid crystal display panel; a metal backlight chassis attached so as to cover a back surface of a backlight unit which irradiates the liquid crystal display panel with light; a bezel in a shape of a frame attached so as to cover an upper surface and a side surface of a periphery of the liquid crystal display panel; a heat sink electrically connected to a periphery of the backlight unit; a printed circuit board provided between the heat sink and the bezel; an electric conductor via which a side wall of the heat sink and a ground land part of the printed circuit board are electrically connected to each other; and a frame provided between the heat sink and the printed circuit board, the frame having an insertion hole in which the electric conductor is to be inserted.

According to the above configuration, the ground land part of the printed circuit board is electrically connected to the metal backlight chassis via the heat sink. The metal backlight chassis is provided so as to cover the back surface of the backlight unit which irradiates the liquid crystal display panel with light, and therefore noise currents are not concentrated in the metal backlight chassis. Therefore, according to the above configuration, unnecessary radiation is suppressed as compared to conventional techniques.

Advantageous Effects of Invention

A liquid crystal display device in accordance with the present invention includes: a liquid crystal display panel; a metal backlight chassis attached so as to cover a back surface of a backlight unit which irradiates the liquid crystal display panel with light; a bezel in a shape of a frame, which bezel is attached so as to cover an upper surface and a side surface of a periphery of the liquid crystal display panel; a printed circuit board provided between a periphery of the backlight unit and the bezel; an electric conductor via which a side wall of the metal backlight chassis and a ground land part of the printed circuit board are electrically connected with each other; and a frame provided between the metal backlight chassis and the printed circuit board, the frame having an insertion hole in which the electric conductor is inserted.

According to the above liquid crystal display device, unnecessary radiation is suppressed as compared to conventional techniques.

DETAILED DESCRIPTION OF THE INVENTION

[Embodiments]

Figure 1:
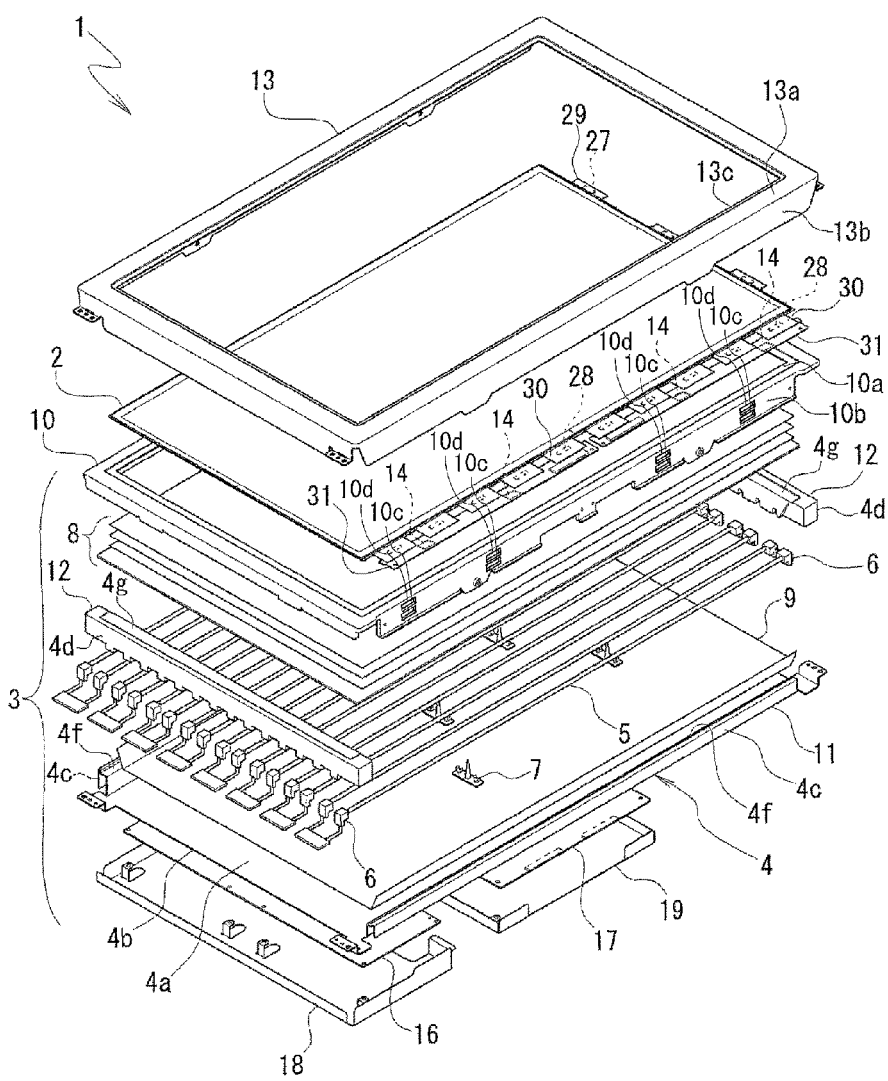
FIG. 1 is an exploded perspective view schematically illustrating a configuration of a liquid crystal display device in accordance with one embodiment of the present invention.

The following description discusses, with reference to the drawings, one embodiment of a liquid crystal display device in accordance with the present invention. FIG. 1 is an exploded perspective view schematically illustrating a configuration of the liquid crystal display device. Note that, in the following description, (i) a front surface side means a side above the liquid crystal display device illustrated in FIG. 1 and (ii) a back surface side means a side below the liquid crystal display device illustrated in FIG. 1.

As illustrated in FIG. 1, a liquid crystal display device 1 includes a liquid crystal display panel 2, a backlight unit 3 provided on a back surface side of the liquid crystal display panel 2, and a metal bezel 13 provided on a front surface side of the liquid crystal display panel 2. The liquid crystal display panel 2 is configured such that (i) a pair of substrates, i.e., a thin film transistor (TFT) array substrate and a color filter (CF) substrate, are arranged so as to face each other in parallel at a predetermined distance, (ii) a space between the two substrates is filled with liquid crystal and (iii) the back surface of the liquid crystal display panel 2 is to be irradiated with light by the backlight unit 3. The light emitted from the backlight unit 3 passes through the liquid crystal display panel 2, thereby an image is visibly displayed on the front surface of the liquid crystal display panel 2. Note that, in the present embodiment, a nonmetal bezel can be used instead of the metal bezel 13.

The backlight unit 3, which irradiates the liquid crystal display panel 2 with light, includes a metal backlight chassis 4 which constitutes an outer frame of the backlight unit 3. A plurality of straight CCFLs (Cold Cathode Fluorescent Lamps) 5 which serve as light source lamps are arranged in a lamp holding surface 4a which is an inner surface of the backlight chassis 4. Each of the plurality of CCFLs 5 is fixed to the backlight chassis 4 with (i) electrode holders 6 and 6 to be attached to end portions of each of the plurality of CCFLs 5 and (ii) a land grip 7 to hold a middle portion of each of the plurality of CCFLs 5.

Above the plurality of CCFLs 5, a group of optical sheets 8 is provided. The group of optical sheets 8 is to control properties of light that enters the liquid crystal panel 2 from the plurality of CCFLs 5 and properties of light that is reflected by a reflection sheet 9, and is a stack of optical plates or optical sheets such as a diffusion plate, a diffusion sheet, a lens sheet, and/or a polarizing reflection sheet which are stacked in this order from the bottom. The group of optical sheets 8 is held, with the use of a frame 10, to placement parts 4f along long sides of the backlight chassis 4 and placement parts 4g along short sides of the backlight chassis 4. The frame 10 is a frame-shaped member made of metal or resin. A periphery of the frame 10 has a side wall 10b pointing toward the back surface side, and each side of the periphery has a substantially reversed L-shaped cross-section surface. Moreover, in the side wall 10b, there are two frame holes (a frame hole 10c and a frame hole 10d) along a direction of a short side of the side wall 10b, and there are four pairs of the frame hole 10c and the frame hole 10d along a direction of a long side of the side wall 10b.

The backlight chassis 4 is constituted by (i) a chassis member 11 obtained by forming, by sheet metal processing, a metal plate material into a base plate 4b in a form of a flat plate which base plate serves as the lamp holding surface 4a and side walls 4c and 4c along long sides of the base plate 4b and (ii) side holder members 12 and 12 having side walls 4d and 4d along short sides of the base plate 4b which side walls 4d and 4d are made of a resin material. The backlight chassis 4 has: the lamp holding surface 4a constituted by the base plate 4b; and the placement parts 4f and the placement parts 4g which are provided on top of the side walls 4c and the side walls 4d, respectively. On the placement parts 4f and the placement parts 4g, the group of optical sheets 8 is placed and held by the frame 10 which is attached so as to cover the group of optical sheets 8.

Further, on the back surface side of the CCFLs 5, that is, on the base plate 4b of the backlight chassis 4, the reflection sheet 9 which is white in color is provided. This reflection sheet 9 reflects, toward the liquid crystal display panel 2, light that is emitted from the CCFLs 5 toward the reflection sheet 9. Note that, on a back surface of the backlight chassis 4, an inverter circuit board 16 and a control circuit board 17 are provided. The inverter circuit board 16 generates a high-voltage pulse voltage for driving the CCFLs 5, and the control circuit board 17 controls operation of the liquid crystal display panel 2. The inverter circuit board 16 and the control circuit board 17 are covered with an inverter circuit board cover 18 and a control circuit board cover 19, respectively.

On the front surface side of the frame 10 of the backlight unit 3 configured like above, the liquid crystal display panel 2 is provided. The liquid crystal display panel 2 and the backlight unit 3 are held by the metal bezel 13 in a form of a frame.

Note that, although FIG. 1 is based on the assumption that light sources are the CCFLs, LED light sources can be used instead of the CCFLs.

Figure 2:
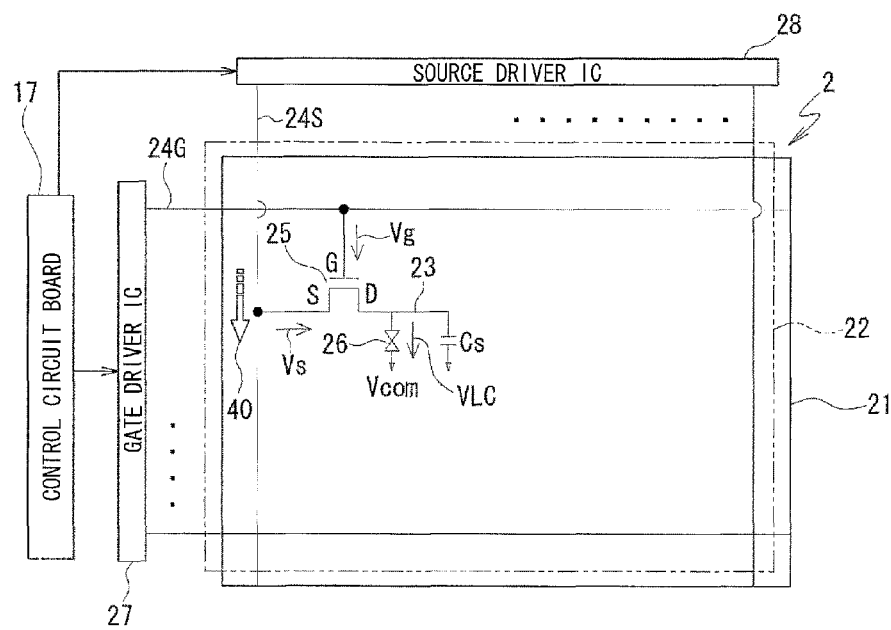
FIG. 2 is a view schematically illustrating a configuration of a liquid crystal display panel included in the liquid crystal display device illustrated in FIG. 1.

FIG. 2 is a view schematically illustrating a configuration of the liquid crystal display panel. As illustrated in FIG. 2, the liquid crystal display panel 2 is configured such that a TFT array substrate 21 and a CF substrate 22 are arranged so as to face each other at a predetermined gap via liquid crystal.

On the almost entire surface of the CF substrate 22, a common electrode, a lattice-like black matrix, and color filters of red, blue, green, and/or the like are provided (each of which is not illustrated). On the TFT substrate 21, a plurality of source wires 24S extending in a vertical direction in parallel to each other and a plurality of gate wires 24G extending in a horizontal direction in parallel to each other are arranged so as to intersect each other. In respective pixel regions defined in a lattice manner by the source wires 24S and the gate wires 24G, pixel electrodes 23 are provided. In the vicinities of intersections of the source wires 24S and the gate wires 24G, TFTs 25 serving as switching elements are provided. Note here that the source wires 24S supply, to the pixel electrodes 23, voltages based on image signals, while the gate wires 24G supplies signals to turn on/off the TFTs 25.

Source electrodes S of the TFTs 25 are connected to the source wires 24S, and gate electrodes G of the TFTs 25 are connected to the gate wires 24G. Drain electrodes D of the TFTs 25 are connected to the pixel electrodes 23. The gate wires 24G are connected to a gate driver IC 27, and the source wires 24S are connected to a source driver IC 28. Both the gate driver IC 27 and the source driver IC 28 are connected to the control circuit board 17, and are individually controlled.

The control circuit board 17 supplies a scanning signal voltage Vg to the gate driver IC 27 which is connected to the gate wires 24G, and the gate driver IC 27 applies the scanning signal voltage Vg to each of the gate wires 24G. The control circuit board 17 supplies an image signal and an image signal voltage Vs based on the image signal to the source driver IC 28 which is connected to the source wires 24S, and the source driver IC 28 applies the image signal voltage Vs to each of the source wires 24S.

Note here that the gate driver IC 27 selects one of the gate wires 24G and applies the scanning signal voltage Vg to the one of the gate wires 24G so as to turn on all TFTs 25 that are connected to the selected one of the gate wires 24G. In synchronization with this, the source driver IC 28 applies, to all of the source wires 24S, the image signal voltages Vs corresponding to driven states of the respective pixels so that all the pixel electrodes 23 which are connected to the respective TFTs 25 receive the image signal voltages Vs.

Note here that a difference between a common voltage Vcom applied to the common electrode and the image signal voltage Vs of each of the pixel electrodes 23 is a liquid crystal driving voltage VLC for driving liquid crystal 26. While the liquid crystal 26 is driven by the liquid crystal driving voltage VLC, the liquid crystal driving voltage VLC is retained by the liquid crystal 26 and a storage capacitor CS. Then, the gate driver IC 27 selects and scans the gate wires 24G sequentially from the top (as indicated by an arrow 40 in FIG. 2), thereby all the pixels are driven and an image for one frame (i.e., one screen) is displayed. By repeating this process at a predetermined frame frequency (frequency at which scanning for one screen is repeatedly carried out), a moving image is displayed.

Further, as illustrated in FIG. 1, a plurality of flexible wiring boards 29 are connected to one short side of four sides of the liquid crystal display panel 2 which is a rectangle. Similarly, a plurality of flexible wiring boards 30 are connected to one long side of the four sides. On the flexible wiring boards 29, there are provided gate driver ICs 27 for supplying scanning signal voltages Vg to the gate wires 24G. On the flexible wiring boards 30, there are provided source driver ICs 28 for supplying, to the source wires 24S, image signal voltages Vs based on image signals.

Note here that one printed circuit board 31 is connected to five flexible wiring boards 30 to which source driver ICs 28 are provided. Furthermore, two printed circuit boards 31 are connected to the control circuit board 17 via cables (not illustrated). Note that the flexible wiring boards to which the gate driver ICs 27 are provided are connected to the printed circuit boards 31 via internal wires (not illustrated) on the liquid crystal display panel 2 and via some of wires on the flexible wiring boards 30.

Each of the printed circuit boards 31 has a long and narrow shape, for example, a rectangle as illustrated in FIG. 1, and is provided along the periphery of the liquid crystal display panel 2. On a surface or on an internal layer of the each of the printed circuit boards 31, various wire patterns are provided along a direction of a long side. As illustrated in FIG. 1, a plurality of flexible wiring boards 30 are connected to one printed circuit board 31. This makes it possible to supply scanning signal voltages Vg to the gate driver ICs 27 and supply image signal voltages Vs to the source driver ICs 28.

Figure 3:
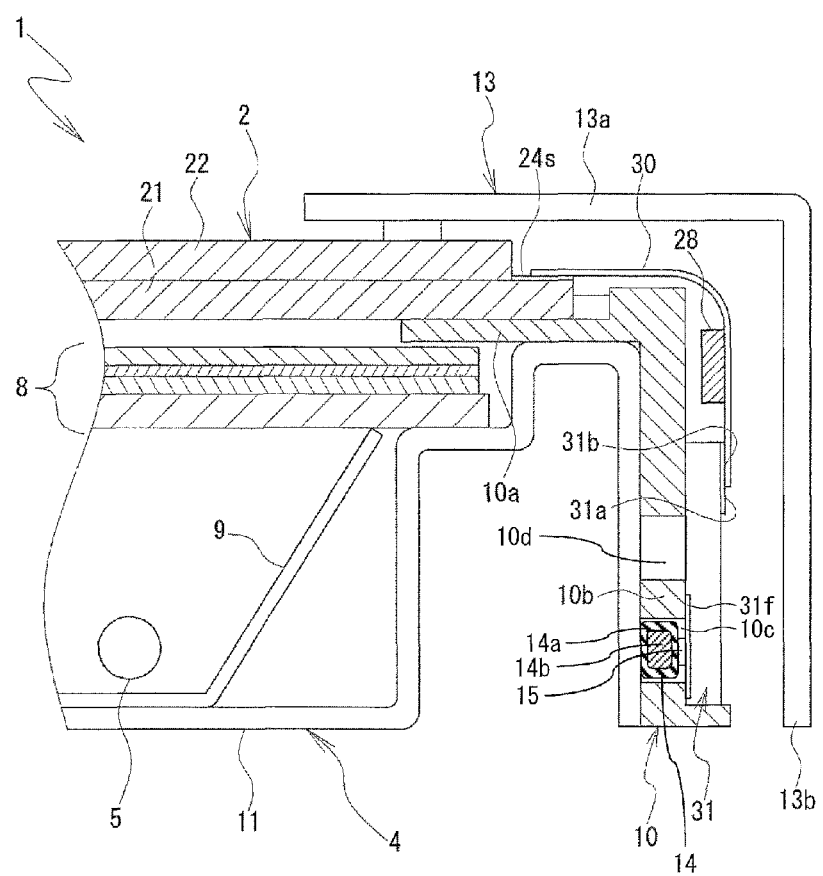
FIG. 3 is a view illustrating a cross section of the liquid crystal display device illustrated in FIG. 1.

FIG. 3 is a cross sectional view for explaining an internal configuration of the liquid crystal display device 1. FIG. 3 is, more specifically, a cross sectional view of an assembled liquid crystal display device 1, which cross sectional view is taken along a plane normal to a direction of a long side of the metal bezel 13.

As illustrated in FIG. 1 and FIG. 3, the metal bezel 13 is a frame-shaped member which has a revered L-shaped cross-section surface and which has a function of holding and protecting the liquid crystal display panel 2. The metal bezel 13 is attached so as to cover an upper surface and a side surface of the periphery of the liquid crystal display panel 2.

The metal bezel 13 is obtained by shaping a plate made of a metal such as a stainless steel into a quadrilateral frame having an opening by press working or the like. Note here that each side of the metal bezel 13 has a reversed L-shaped cross-section surface made up of an upper wall 13a and a side wall 13b. The side wall 13b points toward the back surface side. In the same manner as the metal bezel 13, the frame 10 has a reversed L-shaped cross-section surface, and, on an upper wall 10a of the frame 10, the liquid crystal display panel 2 is placed. A side wall 10b of the frame 10 is in contact with a printed circuit board 31, and has a plurality of frame holes (frame holes 10c and 10d).

The printed circuit board 31 is provided, between the periphery of the backlight unit 3 and the side wall 13b of the metal bezel 13, in substantially parallel to and away from the side wall 13b. The printed circuit board 31 is connected to a flexible wiring board 30 at a wire land part 31b of a wire pattern 31a.

Further, as illustrated in FIG. 3, according to an assembled liquid crystal display device 1, the flexible wiring board 30 is bent, and an end of the flexible wiring board 30, which end is not connected to the wire land part 31b, is connected to a land part of a source wire 24s of the liquid crystal display panel 2.

Note that, before the flexible wiring boards 30 are bent (see FIG. 1), electric conductors 14 are provided to the back surfaces of the printed circuit boards 31.

According to FIG. 3, an electric conductor 14 is constituted by a metal foil 14a and an elastic body 14b, and is inserted in a frame hole 10c. The metal foil 14a and the elastic body 14b are elastically deformable, and thus allow changes in the relative positions of the printed circuit board 31 and the backlight chassis 4 which changes are caused by deformation due to pressure, expansion due to heat, or the like. That is, since the electric conductor 14 is elastically deformable, no force is applied from the electric conductor 14 to the printed circuit board 31 even when the relative positions of the printed circuit board 31 and the backlight chassis 4 change. Accordingly, no force is applied to the flexible wiring board 30 which is connected to the printed circuit board 31, and therefore it is possible to prevent a disconnection in wires provided on the flexible wiring board 30. Note that the electric conductor is not limited provided that the electric conductor is conductive, and can be a member constituted by the elastic body 14b such as a sponge which is covered with the metal foil 14a or the like as illustrated in FIG. 3. Alternatively, the electric conductor can be constituted by a spring or the like.

In this frame hole 10c, the metal foil 14a is fixed to a ground land part 31f on the printed circuit board 31 via an electrically conductive tape 15 such that the metal foil 14a is electrically connected to the ground land part 31f. The ground land part 31f is provided on a surface of the printed circuit board 31 which surface faces the backlight chassis. Further, the electric conductor 14 is inserted in the frame hole 10c, and is elastically deformable. Since the electric conductor 14 is inserted in the frame hole 10c, the electric conductor 14 does not come out of the frame hole 10c even if the electrically conductive tape 15 becomes less adhesive. Therefore, it is possible to hold the electric conductor 14 in place, and also possible to for example prevent the electric conductor 14 from moving and causing a short circuit in wires on substrates. Further, since the electric conductor 14 is elastically deformable, it is possible to unfailingly keep the printed circuit board and the metal backlight chassis electrically connected to each other even if a distance between the printed circuit board and the metal backlight chassis changes due to impact from outside or the like.

Further, since the frame 10 has a plurality of frame holes 10c and a plurality of frame holes 10d as illustrated in FIG. 1, a hole into which the electric conductor 14 is to be inserted can be selected as appropriate. Therefore, it is possible to select a most appropriate insertion hole depending on the layout of the wires on the printed circuit board 31 so that no short circuit will occur in the wires. In other words, the same frame 10 can be used for different printed circuit boards having respective different wire layouts. Therefore, it is possible to reduce production costs.

Further, as illustrated in FIG. 3, according to the present embodiment, it is not the metal bezel 13 but the backlight chassis 4 that is electrically connected via the electric conductor 14 with the ground land part 31f of the printed circuit board 31. Unlike the metal bezel 13, the backlight chassis 4 is not in a form of a bar but in a form of a large-area plate. Further, the printed circuit board 31 has surface contact with the backlight chassis 4 via the electric conductor 14. Therefore, noise currents due to electric conduction are not concentrated in the backlight chassis 4. This enables the liquid crystal display device 1 in accordance with the present embodiment to reduce unnecessary radiation as compared to a conventional configuration in which the ground land part 31f is electrically connected to the metal bezel 13 directly.

Further, according to the present embodiment, the printed circuit board 31 is provided in substantially parallel to and away from the side wall 13b of the metal bezel 13, and is thus not electrically connected to the metal bezel 13 directly.

Note that the metal bezel 13 is fixed to the chassis member 11 of the backlight chassis 4 with the use of a screw or the like, and therefore the metal bezel 13 and the printed circuit board 31 are electrically connected to each other indirectly. However, since the backlight chassis 4 which is large in area and the printed circuit board 31 are electrically connected to each other via the electric conductor 14, noise currents are not concentrated. Therefore, resonance in which a screwed part serves as a node is less likely to occur. This makes it possible to suppress unnecessary radiation.

Figure 4:
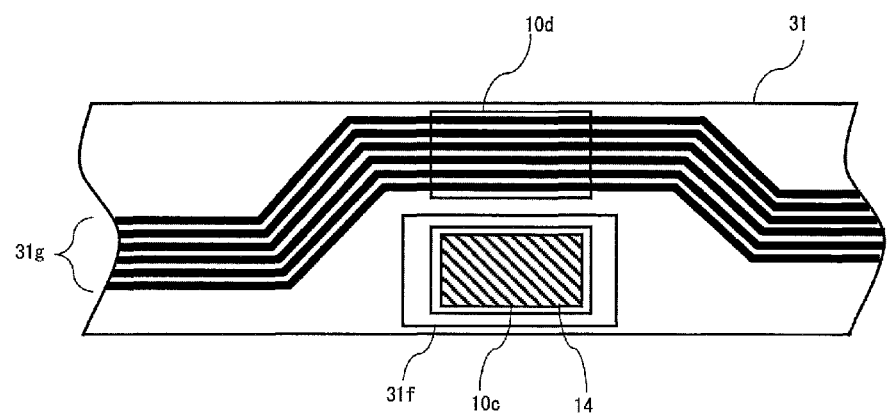
FIG. 4 is a view schematically illustrating relative positions of wires on a printed circuit board and a frame hole, which are included in the liquid crystal display device.

FIG. 4 is a view schematically illustrating relative positions of the wires on the printed circuit board and a frame hole, which are included in the liquid crystal display device. It is often the case that a group of differential wires 31g for transmitting data to a source driver IC 28 are arranged on a surface of the printed circuit board 31 which surface faces the backlight chassis 4. In order to eliminate risks of short circuits that may occur due to the group of differential wires 31g making contact with the ground land part 31f, the ground land part 31f on the printed circuit board 31 is preferably provided away from the group of differential wires 31g. However, the group of differential wires 31g may be provided in different positions depending on printed circuit boards. In view of this, according to the present embodiment, a plurality of frame holes, i.e., the frame holes 10c and 10d, are provided along a direction of a short side of the printed circuit board 31. This makes it possible to insert the electric conductor 14 into either the frame hole 10c or the frame hole 10d, whichever is appropriate for the position of the group of differential wires 31g. Note that the number of frame holes along a direction of a short side of the frame 10 is not limited in particular, and can be one or three or more. Further, the number of frame holes along a direction of a long side of the frame 10 is not limited in particular.

Furthermore, as illustrated in FIG. 1, there are a plurality of frame holes along a direction of a long side of the printed circuit board 31. Therefore, it is possible to insert a plurality of electric conductors into the plurality of frame holes along the direction of the long side, and also possible to freely select frame holes into which the plurality of electric conductors are to be inserted. By inserting the plurality of electric conductors into the frame holes, it is possible to electrically connect the backlight chassis 4 to ground land parts 31f of the printed circuit boards 31 stably over a large area. Further, by inserting a plurality of electric conductors into a plurality of frame holes, it is possible to increase structural strength of the frame 10 etc. as compared to a case where one large frame hole and one large electric conductor are used.

The following explains the steps of assembling the liquid crystal display device 1 of the present embodiment. First, the reflection sheet 9 is laid on the lamp holding surface 4a of the chassis member 11 of the backlight chassis 4. Then, each of the CCFLs 5 is fixed to the front surface of the reflection sheet 9, with the use of the electrode holders 6 and 6 and the land grip 7. Next, the side holder members 12 and 12 are aligned to the respective short sides of the backlight chassis 4, and are attached so as to cover the electrode holders 6 and 6 at the both ends of the CCFLs 5. Thereafter, the group of optical sheets 8 is placed on the placement parts 4f and 4g of the backlight chassis 4 assembled like above, and the frame 10 is attached from the front surface side of the group of optical sheets 8.

Next, the liquid crystal display panel 2, to which the printed circuit boards 31 are connected via the flexible wiring boards 30, is placed on the front surface of the frame 10, that is, on the upper wall 10a. Note here that the flexible wiring boards 30 provided with the driver ICs 28 are bent so as to point toward the back surface side, and the printed circuit boards 31 are fixed to an outside surface of the side wall 10b of the frame 10. At this time, the electric conductor 14, which has been attached to the ground land part 31f of each of the printed circuit boards 31 via the electrically conductive tape 15, is inserted into the frame hole 10c or the frame hole 10d. After that, the metal bezel 13 is attached so as to cover the front surface side of the liquid crystal display panel 2, and is fixed to the chassis member 11 of the backlight chassis 4 with the use of a screw or the like.

Next, the inverter circuit board 16 and the control circuit board 17 are fixed to the back surface of the backlight chassis 4, and the inverter circuit board cover 18 and the control circuit board cover 19 are attached so as to cover the inverter circuit board 16 and the control circuit board 17, respectively. Then, the inverter circuit board 16 is connected to the CCFLs 5 with the use of cables (not illustrated), and the control circuit board 17 is connected to the printed circuit boards 31 with the use of cables (not illustrate) in the same manner. The liquid crystal display panel 1 can be assembled in this manner.

Figure 5:
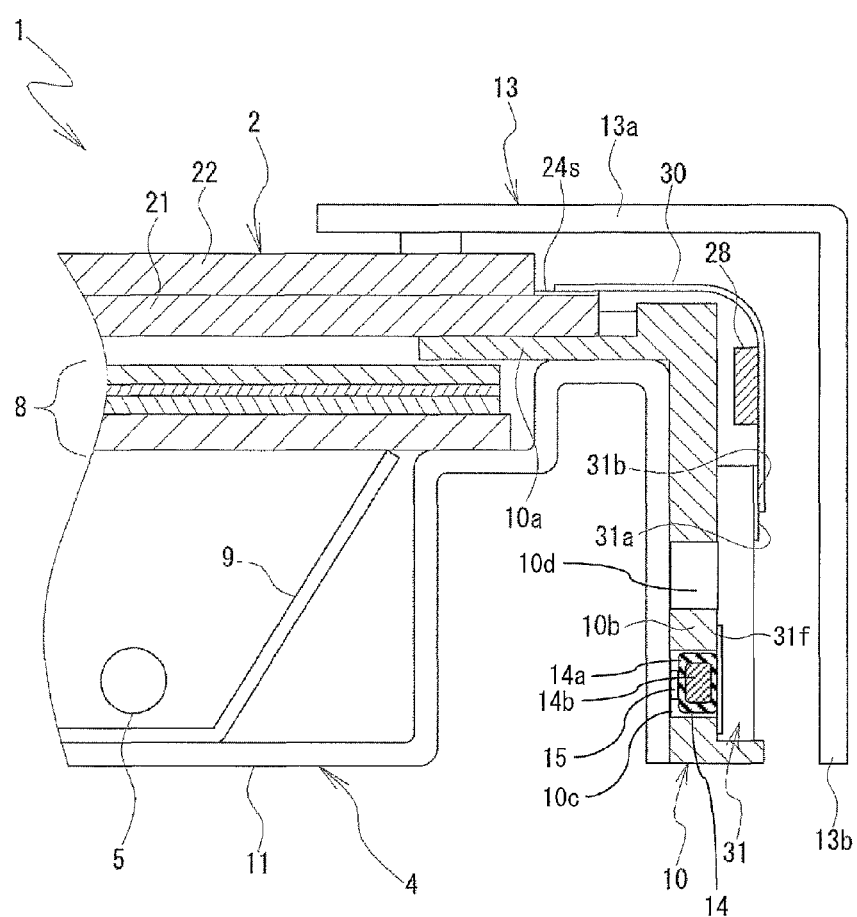
FIG. 5 is another view illustrating a cross section of the liquid crystal display device illustrated in FIG. 1.

Alternatively, as illustrated in FIG. 5, the electric conductor 14 can be fixed inside the frame hole 10c with the use of the electrically conductive tape 15 bonded to the backlight chassis 4. This arrangement also makes it possible to electrically connect a printed circuit board 31 to the backlight chassis 4 via the electric conductor 14 and the electrically conductive tape 15.

Also according to this arrangement, since the backlight chassis 4 is not a bar but a large-area plate unlike the metal bezel 13, the printed circuit board 31 can have surface contact with the backlight chassis 4 via the electric conductor 14. That is, noise currents due to electric conduction are not concentrated in the backlight chassis 4. Therefore, it is possible to suppress unnecessary radiation.

Note that, although the frame 10 of the present embodiment is a frame-shaped member made of metal or resin, the frame 10 can be a soft member such as an insulation sheet.

(Modified Examples)

Figure 6:
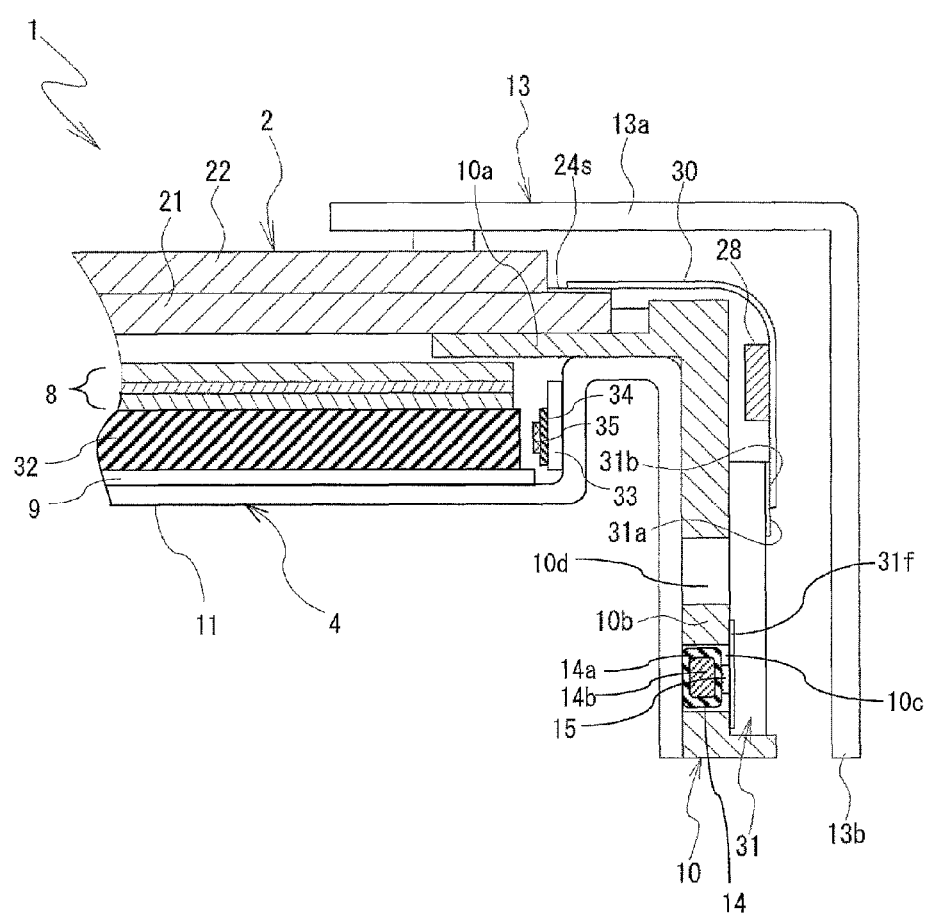
FIG. 6 is a view illustrating a cross section of a liquid crystal display device in accordance with another embodiment of the present invention
Figure 7:
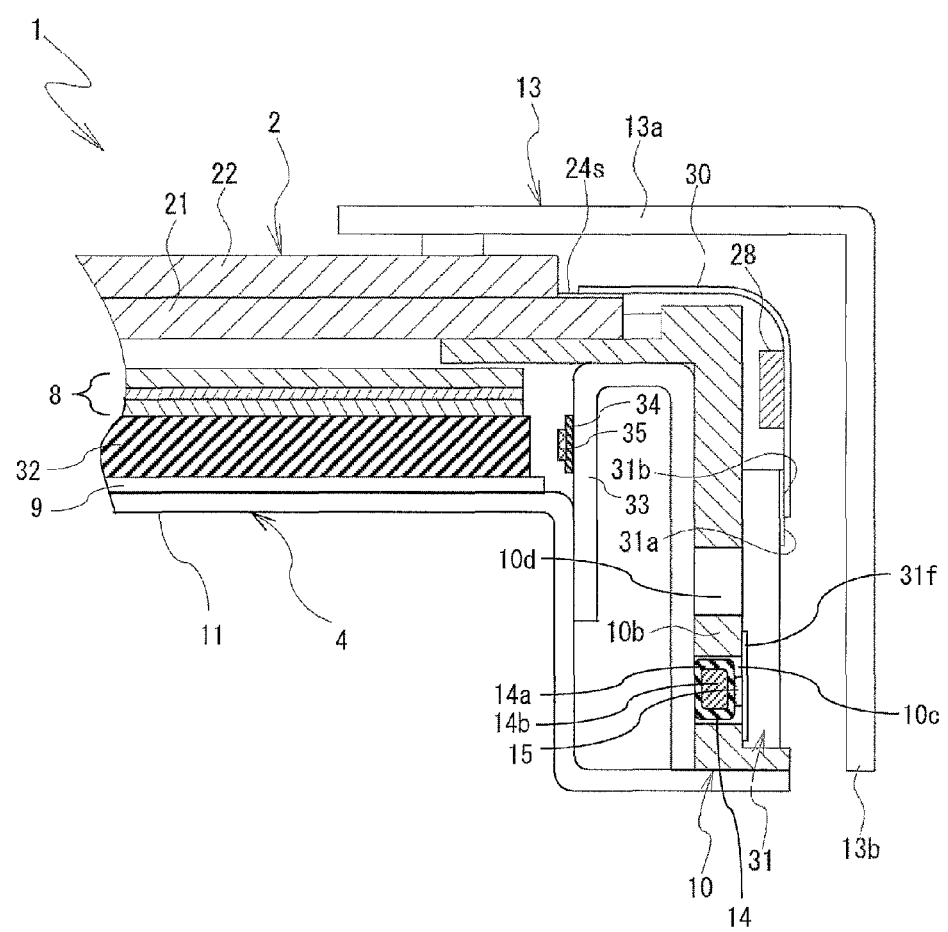
FIG. 7 is another view illustrating a cross section of a liquid crystal display device in accordance with a further embodiment of the present invention.
Figure 8:
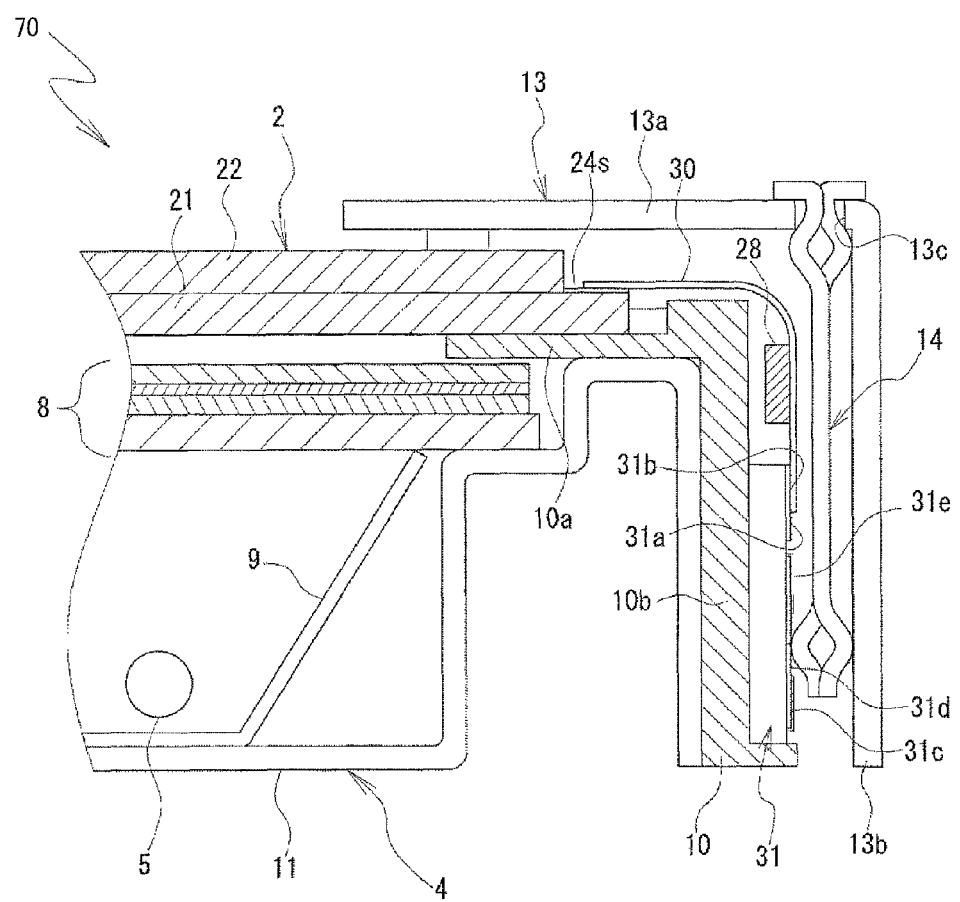
FIG. 8 is a view illustrating a cross section of a liquid crystal display device described in Patent Literature 1.
Figure 9:
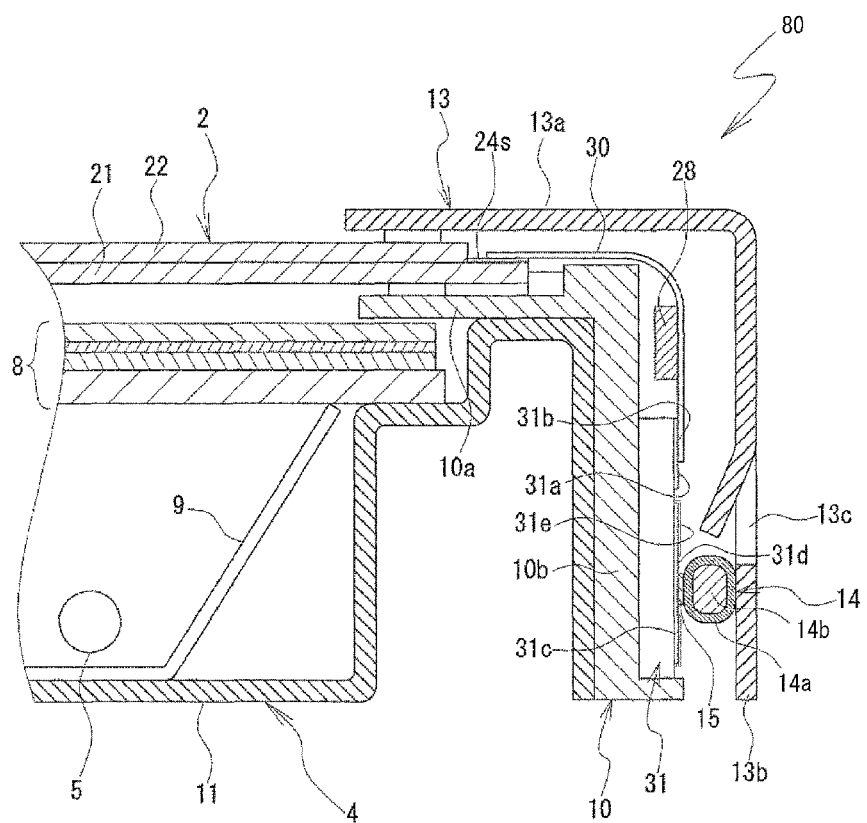
FIG. 9 is a view illustrating a cross section of a display device described in Patent Literature 2.
Figure 10:
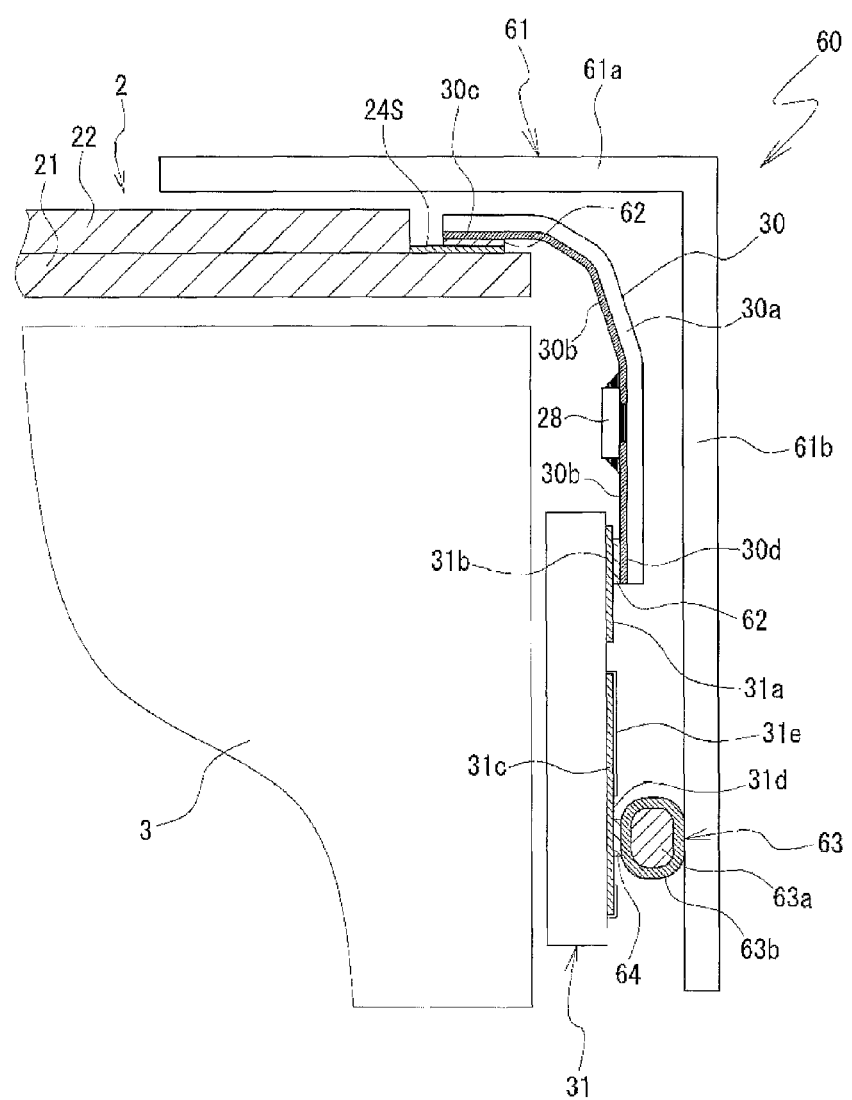
FIG. 10 is a view illustrating a cross section of a liquid crystal display device which has been used conventionally.
Figure 11:
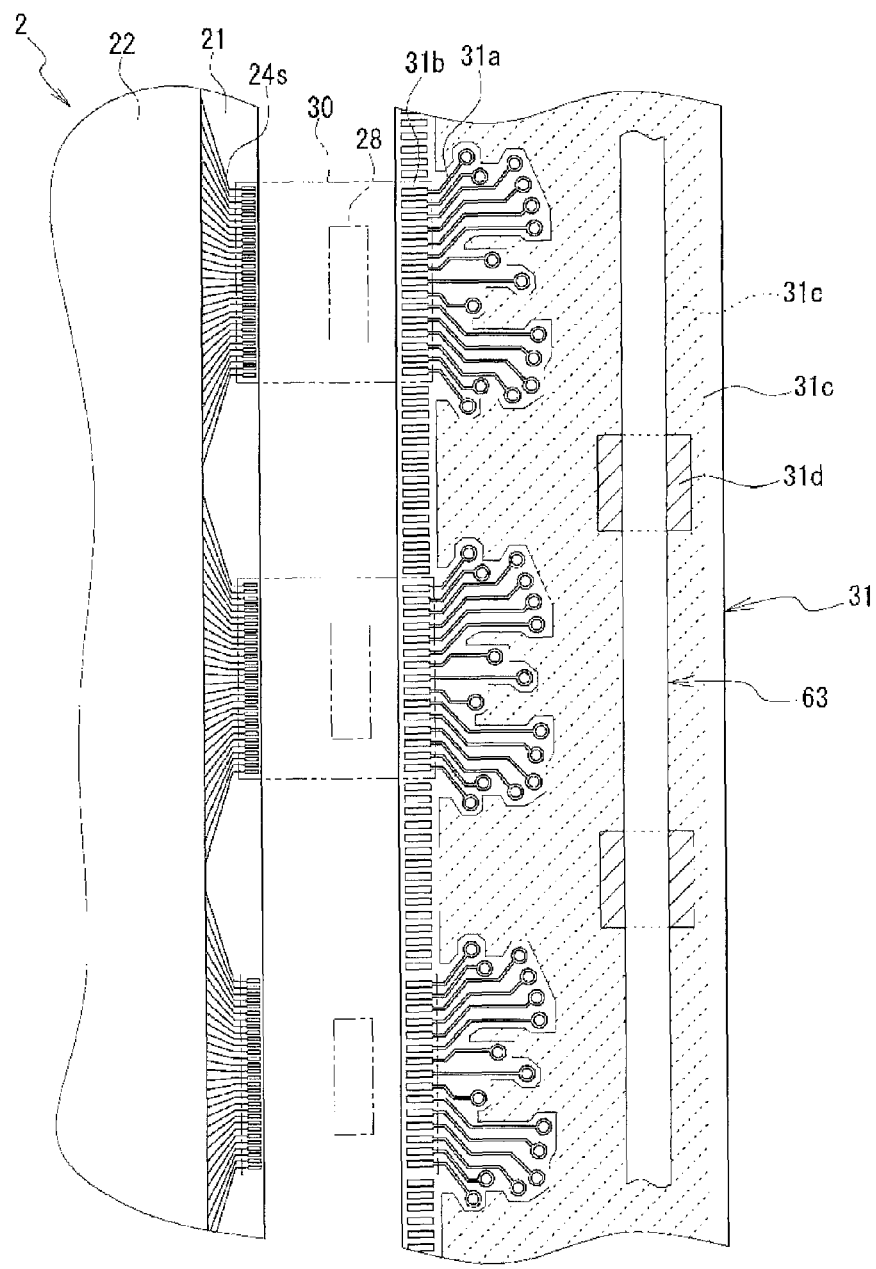
FIG. 11 is a plan view illustrating how a liquid crystal display panel is connected with a printed circuit board, which are included in the liquid crystal display device illustrated in FIG. 10.

The following description discusses modified examples of the present embodiment with reference to FIGS. 6 and 7. FIG. 6 is a view illustrating a cross section of a liquid crystal display device in accordance with another embodiment of the present invention. FIG. 7 is another view illustrating a cross section of a liquid crystal display device in accordance with a further embodiment of the present invention.

Instead of a CCFL 5, an LED 35 can be used as a light source. In a case where the LED 35 is used, the LED 35 is attached to a heat sink 33 via an LED substrate 34 (see FIGS. 6 and 7). According to this arrangement, light emitted from the LED 35 enters a light guide plate 32, spreads widely by being repeatedly reflected at internal surfaces of the light guide plate 32, and then is emitted to the back surface side of the liquid crystal display panel 2.

As illustrated in FIG. 6, the LED 35 is provided to the LED substrate 34, and the LED substrate 34 is attached to the heat sink 33. The heat sink 33 is electrically connected to the backlight chassis 4. The heat sink 33 is an electrically conductive member which, by being attached to a heat-generating member or the like, dissipates heat from the heat-generating member or the like. Therefore, the heat sink 33 dissipates heat coming from the LED 35 via the LED substrate 34, and prevents the LED 35 from deteriorating due to heat. Further, according also to the arrangement in which the LED 35 is used as a light source, as is the case with FIGS. 3 and 5 in which the CCFL 5 is used as a light source, the printed circuit board 31 has surface contact with the backlight chassis 4 via the electric conductor 14. Therefore, noise currents due to electric conduction are not concentrated in the backlight chassis 4, and therefore it is possible to suppress unnecessary radiation.

Alternatively, the heat sink 33 can be provided between the backlight chassis 4 and the electric conductor 14 and electrically connected to the backlight chassis 4 and the electric conductor 14 (see FIG. 7). According also to such a configuration, since the backlight chassis 4 is a large-area plate, the printed circuit board 31 can have surface contact with the backlight chassis 4 via the electric conductor 14 and the heat sink 33. Specifically, noise currents due to electric conduction are not concentrated in the backlight chassis 4, and therefore it is possible to suppress unnecessary radiation.

The present invention is not limited to the description of the embodiments above, but may be altered by a skilled person within the scope of the claims. An embodiment based on a proper combination of technical means disclosed in different embodiments is encompassed in the technical scope of the present invention.

<Conclusion>

As has been described, a liquid crystal display device in accordance with the present invention includes: a liquid crystal display panel; a metal backlight chassis attached so as to cover a back surface of a backlight unit which irradiates the liquid crystal display panel with light; a bezel in a shape of a frame, which bezel is attached so as to cover an upper surface and a side surface of a periphery of the liquid crystal display panel; a printed circuit board provided between a periphery of the backlight unit and the bezel; an electric conductor via which a side wall of the metal backlight chassis and a ground land part of the printed circuit board are electrically connected with each other; and a frame provided between the metal backlight chassis and the printed circuit board, the frame having an insertion hole in which the electric conductor is inserted.

According to the above configuration, the ground land part of the printed circuit board is electrically connected to the metal backlight chassis. The metal backlight chassis is provided so as to cover the back surface of the backlight unit which irradiates the liquid crystal display panel with light, and therefore noise currents are not concentrated in the metal backlight chassis. Therefore, according to the above configuration, unnecessary radiation is suppressed as compared to conventional techniques.

Furthermore, according to the above configuration, the electric conductor via which the side wall of the metal backlight chassis and the ground land part of the printed circuit board are electrically connected is inserted in the insertion hole in the frame. Therefore, the electric conductor is fixed by the insertion hole, and the position of the electric conductor does not change. This makes it possible to prevent the electric conductor from being displaced and thus prevent short circuits etc. from occurring in wires.

A liquid crystal display device in accordance with the present invention includes: a liquid crystal display panel; a metal backlight chassis attached so as to cover a back surface of a backlight unit which irradiates the liquid crystal display panel with light; a bezel in a shape of a frame attached so as to cover an upper surface and a side surface of a periphery of the liquid crystal display panel; a heat sink electrically connected to a periphery of the backlight unit; a printed circuit board provided between the heat sink and the bezel; an electric conductor via which a side wall of the heat sink and a ground land part of the printed circuit board are electrically connected to each other; and a frame provided between the heat sink and the printed circuit board, the frame having an insertion hole in which the electric conductor is to be inserted.

According to the above configuration, the ground land part of the printed circuit board is electrically connected to the metal backlight chassis via the heat sink. The metal backlight chassis is provided so as to cover the back surface of the backlight unit which irradiates the liquid crystal display panel with light, and therefore noise currents are not concentrated in the metal backlight chassis. Therefore, according to the above configuration, unnecessary radiation is suppressed as compared to conventional techniques.

One embodiment of the liquid crystal display device in accordance with the present invention is preferably arranged such that the frame has a plurality of insertion holes arranged along a direction of a short side of the frame; and the electric conductor is inserted in any of the plurality of insertion holes.

According to the above configuration, there are the plurality of insertion holes along a direction of the short side of the frame, and the electric conductor is selectively inserted in any of the plurality of insertion holes. Therefore, it is possible to select the most appropriate insertion hole depending on a layout of the wires on the printed circuit substrate so that no short circuit will occur in wires. In other words, it is possible to use the same frame for different printed circuit boards having different wire layouts. This brings about a further effect of reducing production costs.

In one embodiment of the liquid crystal display device in accordance with the present invention, it is preferable that the frame has a plurality of insertion holes arranged along a direction of a long side of the frame, and the electric conductor is inserted in each of the plurality of insertion holes.

According to the above configuration, since the electric conductor is inserted in each of the plurality of insertion holes, it is possible to electrically connect the metal backlight chassis with the ground land part more stably in comparison with a configuration in which there is only one insertion hole. Further, according to the above configuration, it is possible to increase structural strength of the frame in comparison with a case where there is a single large insertion hole.

In one embodiment of the liquid crystal display device in accordance with the present invention, it is preferable that the electric conductor is elastically deformable.

According to the above configuration, since the electric conductor is elastically deformable, the electric conductor is capable of easily deforming when subjected to heat or pressure. Therefore, even if a distance between the printed circuit board and the metal backlight chassis changes due to impact from outside or the like, it is possible to unfailingly keep the printed circuit board and the metal backlight chassis electrically connected to each other. Further, since no force is applied from the electric conductor to the board, it is possible to reduce risks of disconnection in wires provided on the substrate. Moreover, for example, even in a case where the flexible wiring board is connected to the printed circuit board, it is possible to reduce risks of disconnection in wires provided on the flexible wiring board.

Industrial Applicability

A liquid crystal display device in accordance with the present invention, which liquid crystal display device is configured to suppress EMI, is applicable to display sections of electric home appliances such as a computer and a television set.

REFERENCE SIGNS LIST

1 Liquid crystal display device
2 Liquid crystal display panel
3 Backlight unit
4 Backlight chassis
5 CCFL
6 Electrode holder
7 Land Grip
8 Group of optical sheets
9 Reflection sheet
10 Frame
10c, 10d Frame hole (Insertion hole)
11 Chassis member
12 Side holder member
13 Metal bezel
14 Electric conductor
14a Metal foil
14b Elastic body
15 Electrically conductive tape
16 Inverter circuit board
17 Control circuit board
18 Inverter circuit board cover
19 Control circuit board cover
21 TFT array substrate
22 CF substrate
23 Pixel Electrode
24g Gate wire
24s Source wire
25 TFT
27 Gate driver IC
28 Source driver IC
30 Flexible wiring board
31 Printed circuit board
31d, 31f Ground land part
31g Group of differential wires
32 Light guide plate
33 Heat sink
34 LED substrate
35 LED

The invention claimed is:

1. A liquid crystal display device comprising:
a liquid crystal display panel;
a metal backlight chassis attached so as to cover a back surface of a backlight unit which irradiates the liquid crystal display panel with light;

a bezel in a shape of a frame, which bezel is attached so as to cover an upper surface and a side surface of a periphery of the liquid crystal display panel;

a printed circuit board provided between a periphery of the backlight unit and the bezel;

an electric conductor via which a side wall of the metal backlight chassis and a ground land part of the printed circuit board are electrically connected with each other; and a frame provided between the metal backlight chassis and the printed circuit board, the frame having an insertion hole in which the electric conductor is inserted, wherein:

the frame has a plurality of insertion holes arranged along a direction of a short side of a sidewall of the frame; and the electric conductor is inserted in any of the plurality of insertion holes.

2. The liquid crystal display device as set forth in claim 1, wherein:

the frame has a plurality of insertion holes arranged along a direction of a long side of the frame; and the electric conductor is inserted in each of the plurality of insertion holes.

3. The liquid crystal display device as set forth in claim 1, wherein the electric conductor is elastically deformable.

4. A liquid crystal display device comprising:

a liquid crystal display panel;

a metal backlight chassis attached so as to cover a back surface of a backlight unit which irradiates the liquid crystal display panel with light;

a bezel in a shape of a frame attached so as to cover an upper surface and a side surface of a periphery of the liquid crystal display panel;

a heat sink electrically connected to a periphery of the backlight unit;

a printed circuit board provided between the heat sink and the bezel;

an electric conductor via which a side wall of the heat sink and a ground land part of the printed circuit board are electrically connected to each other; and a frame provided between the heat sink and the printed circuit board, the frame having an insertion hole in which the electric conductor is to be inserted, wherein:

the frame has a plurality of insertion holes arranged along a direction of a short side of a sidewall of the frame.

5. The liquid crystal display device as set forth in claim 4, wherein:

the electric conductor is inserted in any of the plurality of insertion holes.

6. The liquid crystal display device as set forth in claim 4, wherein:

the frame has a plurality of insertion holes arranged along a direction of a long side of the frame; and the electric conductor is inserted in each of the plurality of insertion holes.

7. The liquid crystal display device as set forth in claim 4, wherein the electric conductor is elastically deformable.

* * * * *